(12) United States Patent
Nishimura

(10) Patent No.: US 7,532,717 B2
(45) Date of Patent: May 12, 2009

(54) ECHO CANCELER WITH AUTOMATIC GAIN CONTROL OF ECHO CANCELLATION SIGNAL

(75) Inventor: Eiichi Nishimura, Kanagawa (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1556 days.

(21) Appl. No.: 09/963,499

(22) Filed: Sep. 27, 2001

(65) Prior Publication Data

US 2002/0076037 A1 Jun. 20, 2002

(30) Foreign Application Priority Data

Dec. 15, 2000 (JP) ............... 2000-381204

(51) Int. Cl.
*H04M 9/08* (2006.01)
(52) U.S. Cl. .............. 379/406.01; 379/406.07
(58) Field of Classification Search ........ 379/388, 379/390, 406
See application file for complete search history.

(56) References Cited

U.S. PATENT DOCUMENTS

| 4,600,815 A | 7/1986 | Horna .............. 379/406.08 |
| 6,381,224 B1* | 4/2002 | Lane et al. ............ 370/286 |
| 6,580,795 B1* | 6/2003 | Li et al. ............ 379/406.14 |

FOREIGN PATENT DOCUMENTS

JP 59-43637 3/1984

* cited by examiner

*Primary Examiner*—Walter F Briney, III
(74) *Attorney, Agent, or Firm*—Rabin & Berdo, PC

(57) ABSTRACT

An echo canceler removes the echo of a receive signal from a transmit signal while also controlling the signal level of the transmit signal. The echo canceler generates signal level data for the transmit signal, updates the signal level data when the transmit signal is active and the receive signal is inactive, and amplifies the transmit signal according to the signal level data. The echo canceler also generates an echo cancellation signal from the receive signal, amplifies the echo cancellation signal according to the signal level data, and subtracts the amplified echo cancellation signal from the amplified transmit signal to obtain a transmit output signal.

7 Claims, 8 Drawing Sheets

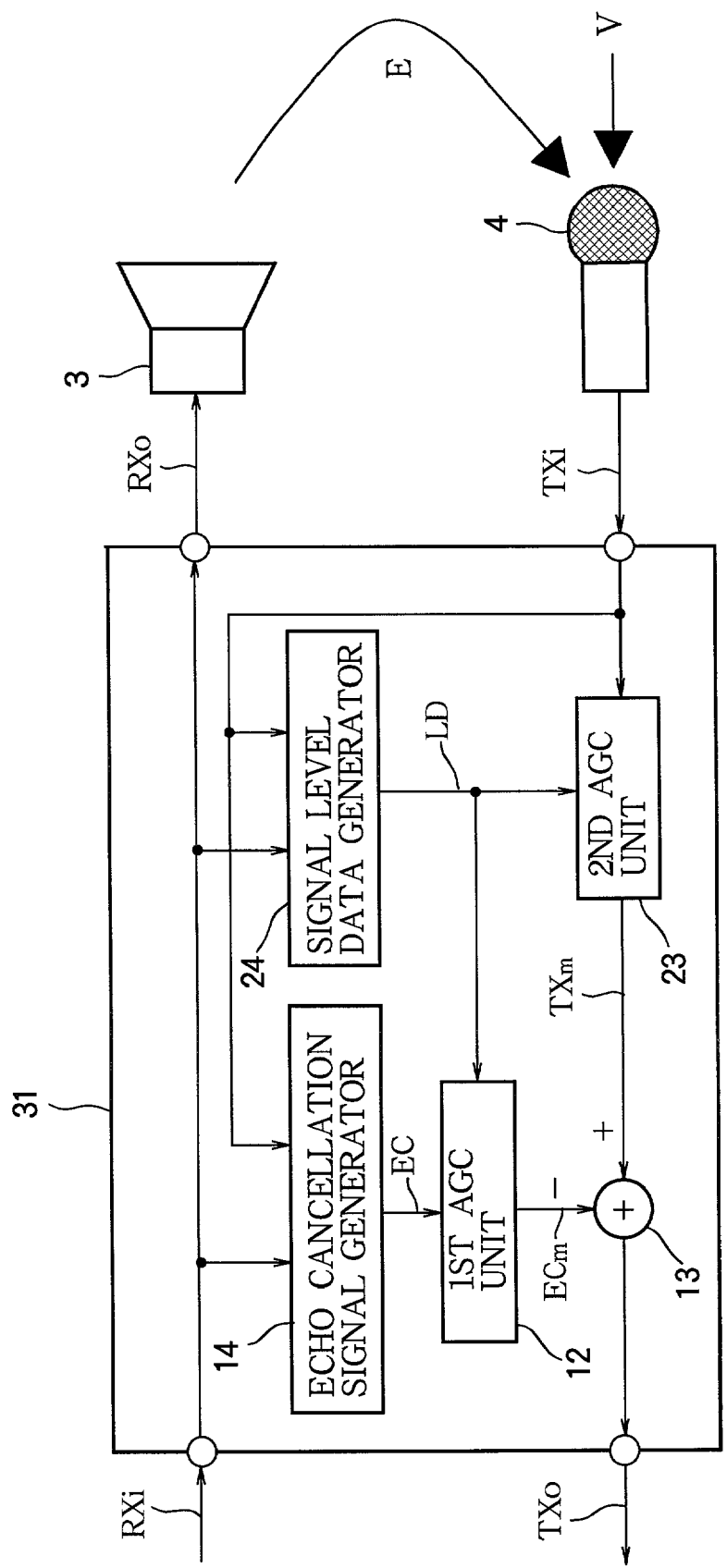

FIG.3A
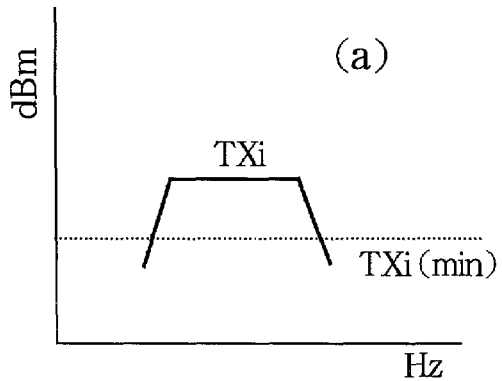
(a)
FIG.3B
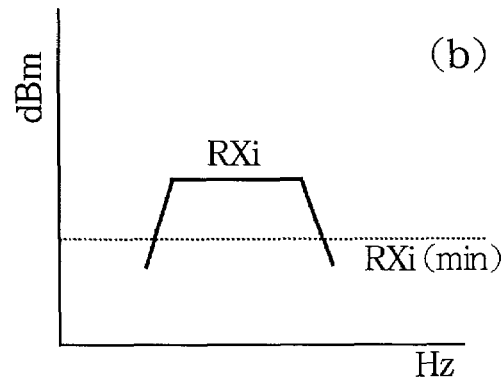
(b)
FIG.3C
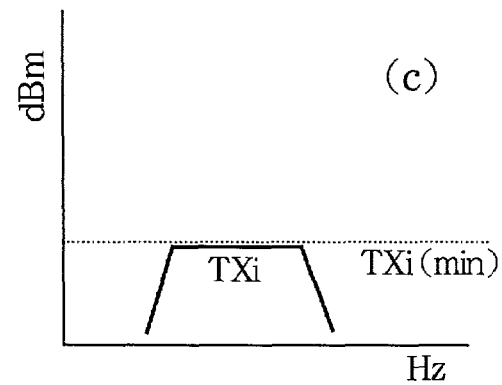
(c)
FIG.3D
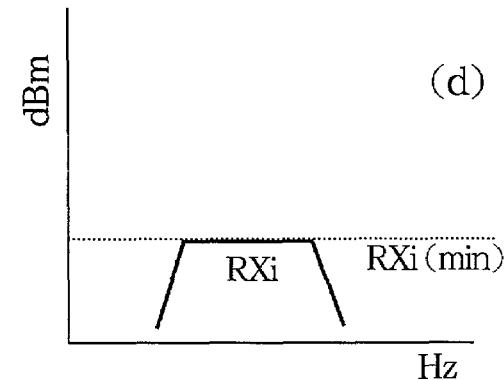
(d)
FIG.4
| CONDITION | LD | ECHO CANCELLATION COEFFICIENTS |
|---|---|---|
| (a)+(b) → | UNCHANGED | UNCHANGED |
| (a)+(d) → | UPDATED | UNCHANGED |
| (c)+(b) → | UNCHANGED | UPDATED |
| (c)+(d) → | UNCHANGED | UNCHANGED |

ECHO CANCELER WITH AUTOMATIC GAIN CONTROL OF ECHO CANCELLATION SIGNAL

BACKGROUND OF THE INVENTION

The present invention relates to an echo canceler for canceling echo in a full-duplex communication device, more particularly to an echo canceler that outputs a transmit signal with automatic gain control.

Many telephone sets, including both cordless telephone sets and those with cords, have a hands-free function or speakerphone function that enables the user to hold a telephone conversation without picking up a handset. In a cordless telephone, this function can be implemented by increasing the volume of the loudspeaker and the sensitivity of the microphone, so that the handset does not have to be held next to the user's head.

A problem in hands-free conversations is that the far-end party's voice signal, when reproduced through the loudspeaker, is picked up by the microphone and becomes an echo signal. If the microphone is close to the loudspeaker, the echo may be strong enough to establish a positive feedback loop, causing the unpleasant phenomenon known as howling. Telephone sets with a hands-free or speakerphone function therefore also include an echo canceler to attenuate the echo signal. An echo canceler uses the incoming far-end signal to estimate the echo signal that will be produced, and subtracts the estimated echo signal from the signal received from the microphone, thereby eliminating or at least reducing the echo.

The loudspeaker of a telephone handset normally produces a signal that can be heard comfortably when the handset is held next to the user's ear. When a cordless telephone is used in a hands-free mode, the volume of the voice signal received at the microphone is highly variable, so to avoid discomfort to the far-end party, it may be necessary to attenuate the voice signal when it is too strong, as well as amplifying the voice signal when it is too weak. Recent cordless telephone sets and similar devices therefore have circuits that automatically adjust the microphone input signal to an appropriate level, in addition to an echo canceler that cancels the unwanted echo component.

FIG. 9 illustrates a telephone set having an echo canceler 1 and a separate automatic level adjuster 2. The signal RXi received from the far end is sampled in the echo canceler 1, supplied as a receive output signal RXo to a loudspeaker 3, and reproduced as sound. Part of the reproduced sound returns as an echo E to the microphone 4 that picks up the near-end voice signal V. The transmit input signal TXi from the microphone 3 is amplified or attenuated with automatic gain control in the automatic level adjuster 2, and the resulting transmit signal TXm is supplied to the echo canceler 1. The echo canceler 1 estimates and cancels the echo component, generating a transmit output signal TXo which is sent to the far end.

The echo canceler 1 includes an echo cancellation signal generator 11 that receives RXi and TXm and generates an echo cancellation signal EC, and a subtractor 13 that subtracts EC from TXm to cancel the echo. The subtractor 13 is shown as an adder with an inverting (−) input terminal; that is, the echo cancellation signal EC is inverted so that it is opposite in polarity to the estimated echo, and is then added to the amplified or attenuated transmit signal TXm to cancel the echo component therein. The echo cancellation signal generator 11 generates the echo cancellation signal EC by use of a technique known as predictive filtering, which estimates the strength of the echo as a function of the echo delay. The echo cancellation signal generator 11 also updates the predictive filtering coefficients to adjust to changes in the acoustic characteristics of the echo path.

The echo cancellation signal generator 11 monitors the level of the amplified or attenuated transmit signal TXm, and updates the predictive filtering coefficients only when this level is low, normally because the near-end party is not speaking. If the characteristics of the echo path do not change and the gain employed in the automatic level adjuster 2 remains constant, the updating algorithm forces the coefficients to converge to values that predict the echo accurately, so that the echo signal is canceled substantially completely. When the echo path characteristics and/or the gain of the automatic level adjuster 2 change, however, echo cancellation becomes incomplete until the echo cancellation signal generator 11 can adjust to the new conditions.

The automatic level adjuster 2 includes a signal level data generator 21 that detects the level of the transmit input signal TXi and generates signal level data LD indicating the difference between the detected signal level and an arbitrary reference level. The signal level data generator 21 also includes an automatic gain control (AGC) unit 22 that amplifies or attenuates the transmit input signal TXi with a gain responsive to the signal level data LD, thereby holding the level of the amplified (or attenuated) transmit signal TXm substantially equal to the reference level. The gain is adjusted when the transmit input signal TXi has at least a certain minimum level, regardless of the presence or absence of echo; the gain is left unchanged when the TXi level is below this minimum level.

A problem arising in FIG. 9 is that the varying gain employed in the automatic level adjuster 2 interferes with the accurate operation of the echo canceler 1. Each time the gain in the automatic level adjuster 2 is changed, the echo canceler 1 must adjust its predictive filtering coefficients to the new gain, and a residual echo remains until the coefficients have converged to appropriate new values. This problem arises because the echo canceler 1 and automatic level adjuster 2 operate independently. Further information will be given in the detailed description of the invention.

One conceivable solution to this problem would be to place the automatic level adjuster 2 after the echo canceler 1 on the transmit signal path, thus deferring automatic gain control until the echo had already been canceled. This solution can fail, however, when the automatic level adjuster 2 operates with a comparatively high gain. At such times, after the echo canceler 1 has reduced the echo component to a negligible level, the automatic level adjuster 2 amplifies the echo component again, so the far-end party may hear an audible residual echo.

SUMMARY OF THE INVENTION

An object of the present invention is to provide an echo canceler that can accurately perform both echo cancellation and automatic gain control.

The invented echo canceler has as its inputs a transmit signal and a receive signal, the transmit signal including an echo of the receive signal.

A signal level data generator detects activity of the transmit signal and the receive signal, generates signal level data for the transmit signal, and updates the signal level data when the transmit signal level is active and the receive signal level is inactive. The signal level data are left unchanged when the receive signal is active.

An echo cancellation signal generator generates an echo cancellation signal from the receive signal.

On the basis of the signal level data supplied by the signal level data generator, a first AGC unit amplifies the echo cancellation signal, and a second AGC unit amplifies the transmit signal. An arithmetic unit subtracts the amplified echo cancellation signal from the amplified transmit signal, thereby removing the echo component from the transmit signal.

The echo cancellation signal generator preferably updates the coefficients used to generate the echo cancellation signal when the receive signal is active and the transmit signal is inactive.

The echo component is canceled accurately because the first AGC unit and second AGC unit both operate according to the same signal level data. Automatic gain control is carried out accurately because the signal level data generator does not update the signal level data while the receive signal is active.

BRIEF DESCRIPTION OF THE DRAWINGS

In the attached drawings:

FIG. 1 is a block diagram showing an echo canceler embodying the invention;

FIGS. 3A, 3B, 3C, and 3D show frequency spectra illustrating the operation of the echo canceler in FIG. 1;

FIG. 4 is a table summarizing the operation of the echo canceler in FIG. 1;

DETAILED DESCRIPTION OF THE INVENTION

Figure 2A:
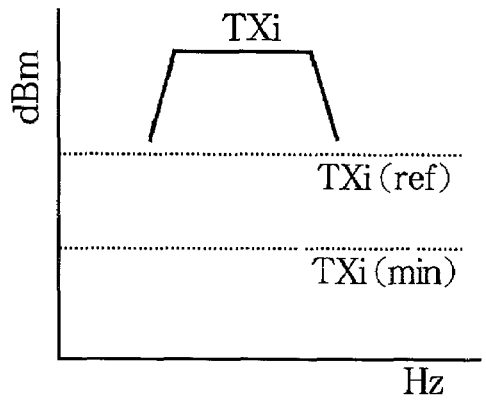
FIGS. 2A, 2B, 2C, 2D, and 2E show frequency spectra illustrating automatic gain control.

An echo canceler embodying the present invention will be described with reference to the attached drawings, in which like parts are indicated by like reference characters.

Referring to FIG. 1, the echo canceler 31 receives a transmit input signal TXi from a microphone 4, and a receive input signal RXi from a communication link (not visible). In the echo canceler 31, both input signals TXi and RXi are supplied to a signal level data generator 24, which compares them with respective minimum input levels and generates signal level data LD for the transmit input signal TXi. Both signals TXi and RXi are also supplied to a conventional echo cancellation signal generator 14, which generates an echo cancellation signal EC. The echo cancellation signal EC is supplied to a first AGC unit 12 and therein amplified or attenuated by multiplication by a gain factor determined from the signal level data LD. The transmit input signal TXi is supplied to a second AGC unit 23 and is similarly amplified or attenuated by multiplication by a gain factor determined from the signal level data LD. A subtractor 13 subtracts the amplified or attenuated echo cancellation signal ECm from the amplified or attenuated transmit signal TXm to generate a transmit output signal TXo, which is sent over the communication link to the party at the far end.

In the description below, ECm will be referred to as the amplified echo cancellation signal, and TXm will be referred to as the amplified echo cancellation signal, attenuation being regarded as amplification with less than unity gain.

The first AGC unit 12 and second AGC unit 23 both have the same internal configuration (not visible) and operate with the same gain.

The receive input signal RXi is also supplied as a receive output signal RXo to a loudspeaker 3. As in the prior art, part of the acoustic output of the loudspeaker 3 becomes an echo E that is picked up by the microphone 4 and added to the near-end voice signal V.

Figure 9:
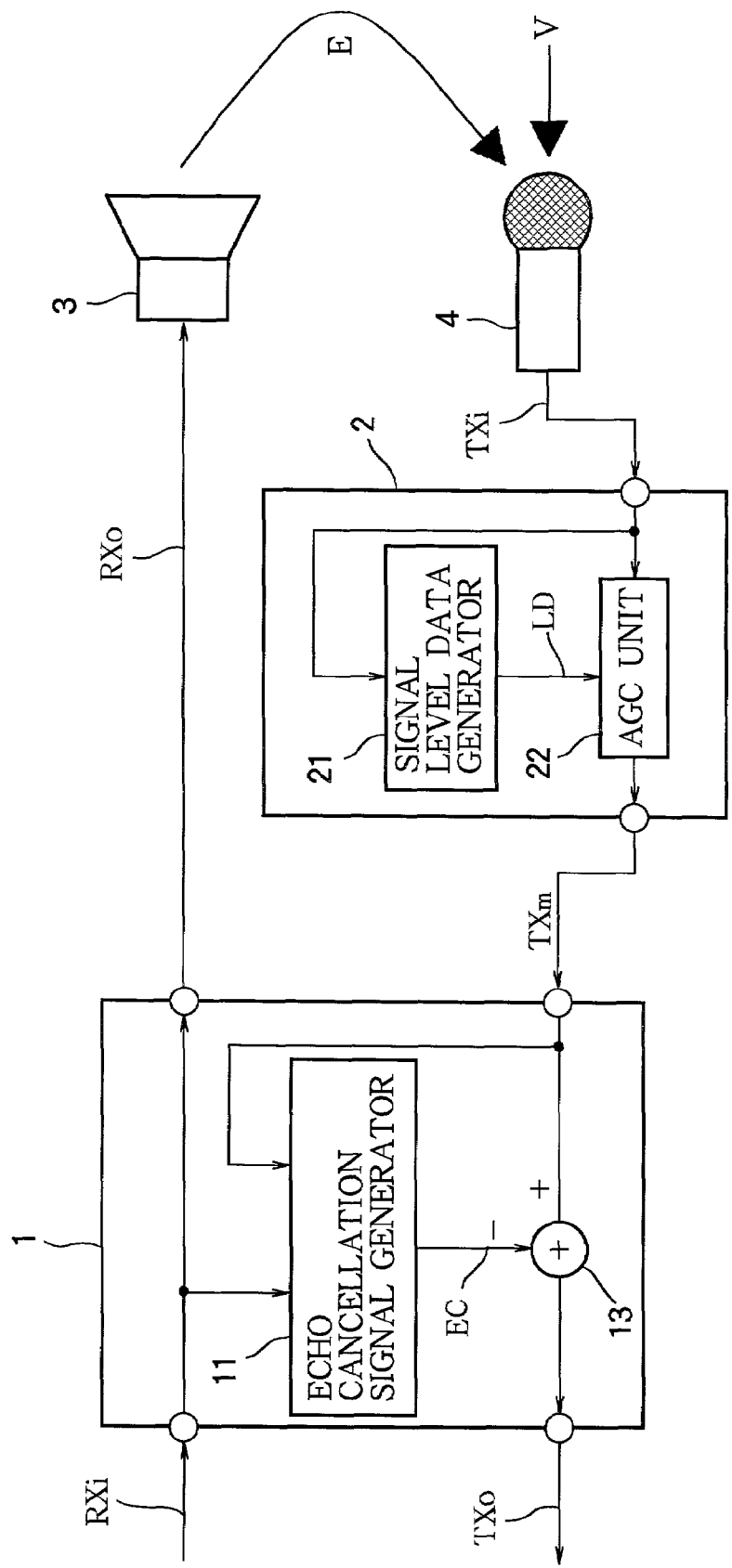
FIG. 9 is a block diagram of a conventional telephone set having an echo canceler and an automatic level adjuster.

The echo canceler 31 differs from the conventional structure shown in FIG. 9 by inserting the first AGC unit 12 between the subtractor 13 and echo cancellation signal generator 14, by having the echo cancellation signal generator 14 monitor the transmit input signal TXi instead of the amplified transmit signal TXm, and by having the signal level data generator 24 detect the levels of both the transmit input signal TXi and receive input signal RXi instead of detecting only the TXi level.

Next the operation of the echo canceler 31 will be described.

FIGS. 2A to 2E illustrate the basic operation of a conventional automatic level adjuster by showing frequency spectra of transmit signals TXi and TXm. Frequency is indicated in hertz (Hz) on the horizontal axis, and signal level in milliwatt decibels (dBm) on the vertical axis. The dotted lines indicate a minimum input level TXi(min) and a target or reference level TXi(ref).

Figure 2B:
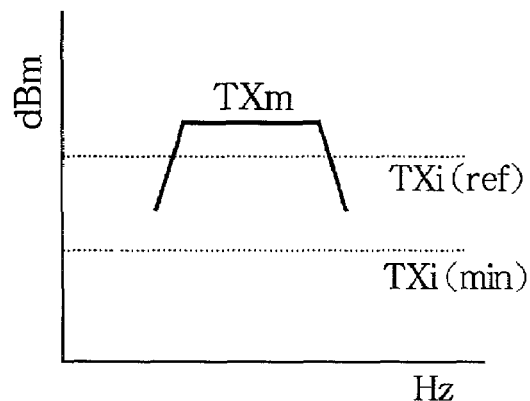
Figure 2C:
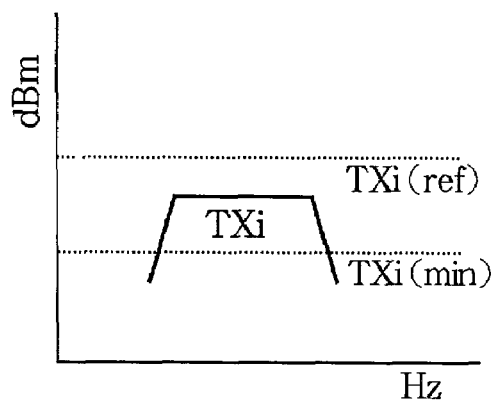

When the transmit input signal level exceeds the reference level TXi(ref), as in FIG. 2A, the automatic level adjuster attenuates the transmit input signal TXi so that the level of the amplified transmit signal TXm is substantially equal to the reference level, as in FIG. 2B. When the transmit input signal level is less than the reference level TXi(ref) but exceeds the minimum input level TXi(min), as in FIG. 2C, the automatic level adjuster amplifies the transmit input signal TXi so that the TXm level is again substantially equal to the reference level, as in FIG. 2D. When the transmit input signal level is less than the minimum input level TXi(min), as in FIG. 2E, the automatic level adjuster does not update the signal level data, the gain remains constant, and the level of the amplified transmit signal TXm may vary.

Figure 2D:
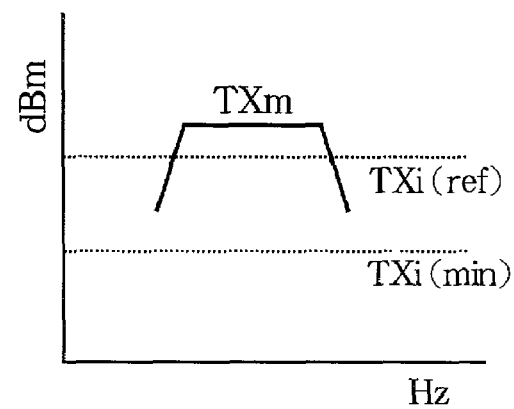
Figure 2E:
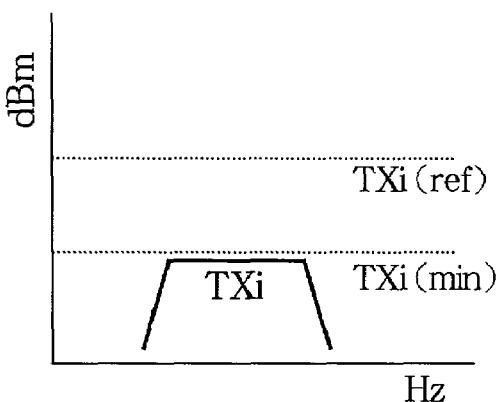

Automatic gain control as in FIGS. 2B and 2D is conventionally performed whenever the transmit input signal level exceeds the minimum level TXi(min), regardless of the degree to which echo is present. The presence of a strong and variable echo component in the transmit input signal, however, can produce undesired gain variations, which then have a disrupting effect on the operation of the echo cancellation signal generator 14, so that echo is not canceled correctly. Automatic gain control in the invented echo canceler 31 therefore operates basically as in FIGS. 2A to 2E, but with further restrictions on the adjustment of the gain.

The echo cancellation signal generator 14 and signal level data generator 24 in the invented echo canceler 31 compare the level of the transmit input signal TXi with a first minimum input level TXi(min), and compare the level of the receive input signal RXi with a second minimum input level RXi(min), to determine the activity of these two input signals. The two minimum input levels TXi(min) and RXi(min) represent, for example, minimum levels necessary for valid automatic gain control and valid filter coefficient updating. The two minimum input levels TXi(min) and RXi(min) need not be the same.

The invented echo canceler 31 detects the four conditions (a) to (d) illustrated in FIGS. 3A to 3D. These drawings show frequency spectra of the transmit input signal TXi and receive input signal RXi, with frequency on the horizontal axis and signal level on the vertical axis. In condition (a), the transmit input signal level equals or exceeds its minimum input level TXi(min), and is determined to be active. In condition (b), the receive input signal level equals or exceeds its minimum input level RXi(min), and is determined to be active. In condition (c), the transmit input signal level is less than its minimum input level TXi(min), and is determined to be inactive. In condition (d), the receive input signal level is less than its minimum input level RXi(min), and is determined to be inactive.

As shown in FIG. 4, the signal level data generator 24 updates the signal level data LD when conditions (a) and (d) are detected simultaneously. Under all other combinations of conditions (a) to (d), the signal level data generator 24 leaves the signal level data LD unchanged.

The echo cancellation signal generator 14 updates the predictive filter coefficients, by which the echo cancellation signal EC is generated, when conditions (b) and (c) are detected simultaneously. Under all other combinations of conditions (a) to (d), the echo cancellation signal generator 14 leaves these coefficients unchanged.

Figure 5:
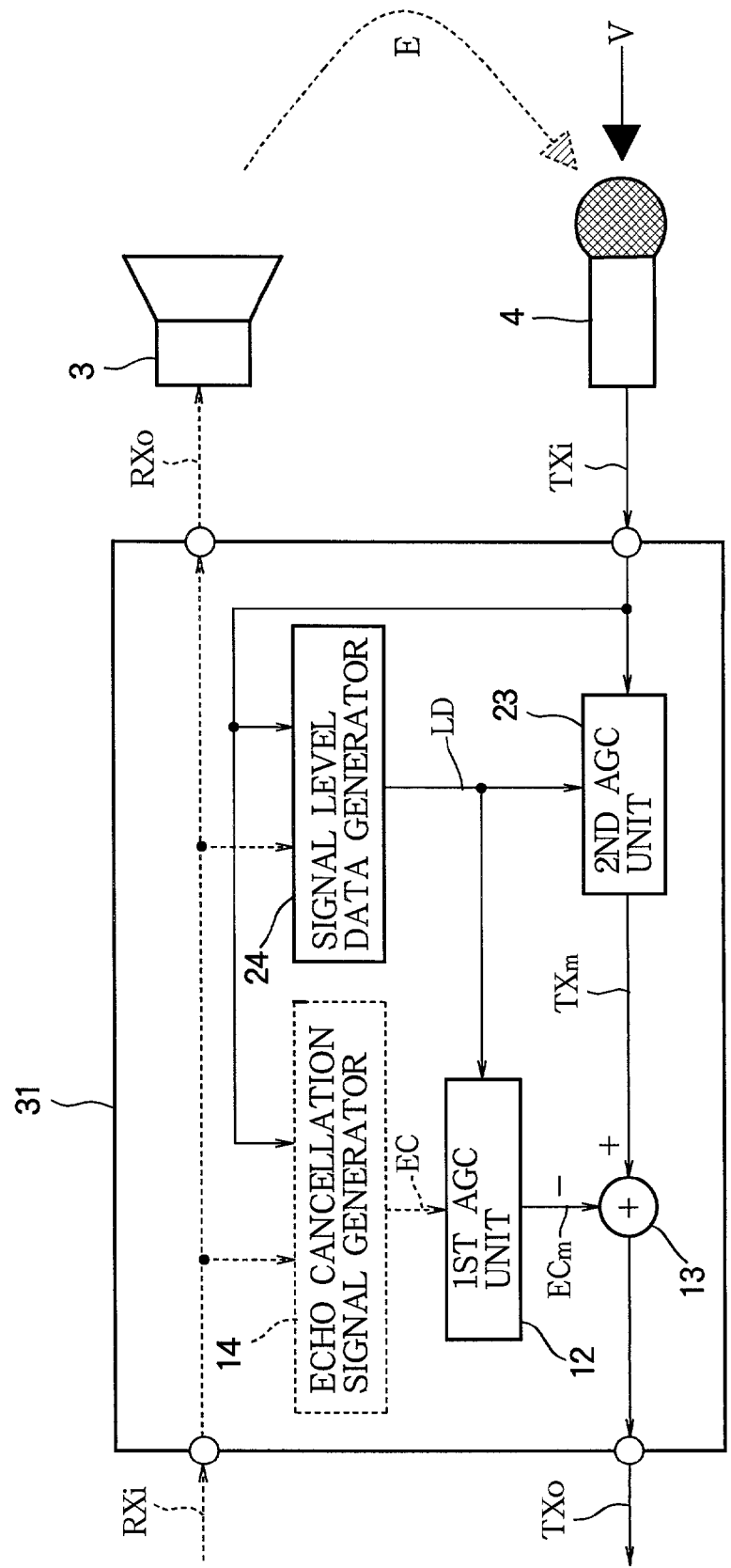
FIGS. 5, 6, 7, and 8 are block diagrams illustrating the operation of the echo canceler in FIG. 1.

FIG. 5 illustrates the operation of the echo canceler 31 when conditions (a) and (d) are detected simultaneously: that is, when the transmit input signal is active (TXi≧TXi(min)) and the receive input signal is inactive (RXi<RXi (min)). The receive input signal RXi is shown as a dotted line to indicate a sub-minimum level. The echo E and echo cancellation signal EC are correspondingly low in level, and are therefore also indicated by dotted lines. The echo cancellation signal generator 14 is shown in a dotted box to indicate that the predictive filter coefficients are not being updated. The signal level data generator 24 updates the signal level data LD according to the transmit input signal level. The second AGC unit 23 operates according to the signal level data LD, holding the amplified transmit signal TXm at a substantially constant level, as in FIGS. 2B and 2D.

The first AGC unit 12 also operates according to the signal level data LD, thus amplifying the echo cancellation signal EC. If a small echo E is present, it is amplified by the second AGC unit 23, but the echo cancellation signal EC is equally amplified by the AGC unit 22, so the amplified echo component in the amplified transmit signal TXm is correctly canceled by subtraction of the amplified echo cancellation signal ECm. If the gain of the second AGC unit 23 increases or decreases, the gain of the first AGC unit 12 increases or decreases by the same amount, so correct echo cancellation continues. The gain variations do not affect the predictive filtering process, because the filtering coefficients are not updated.

Figure 6:
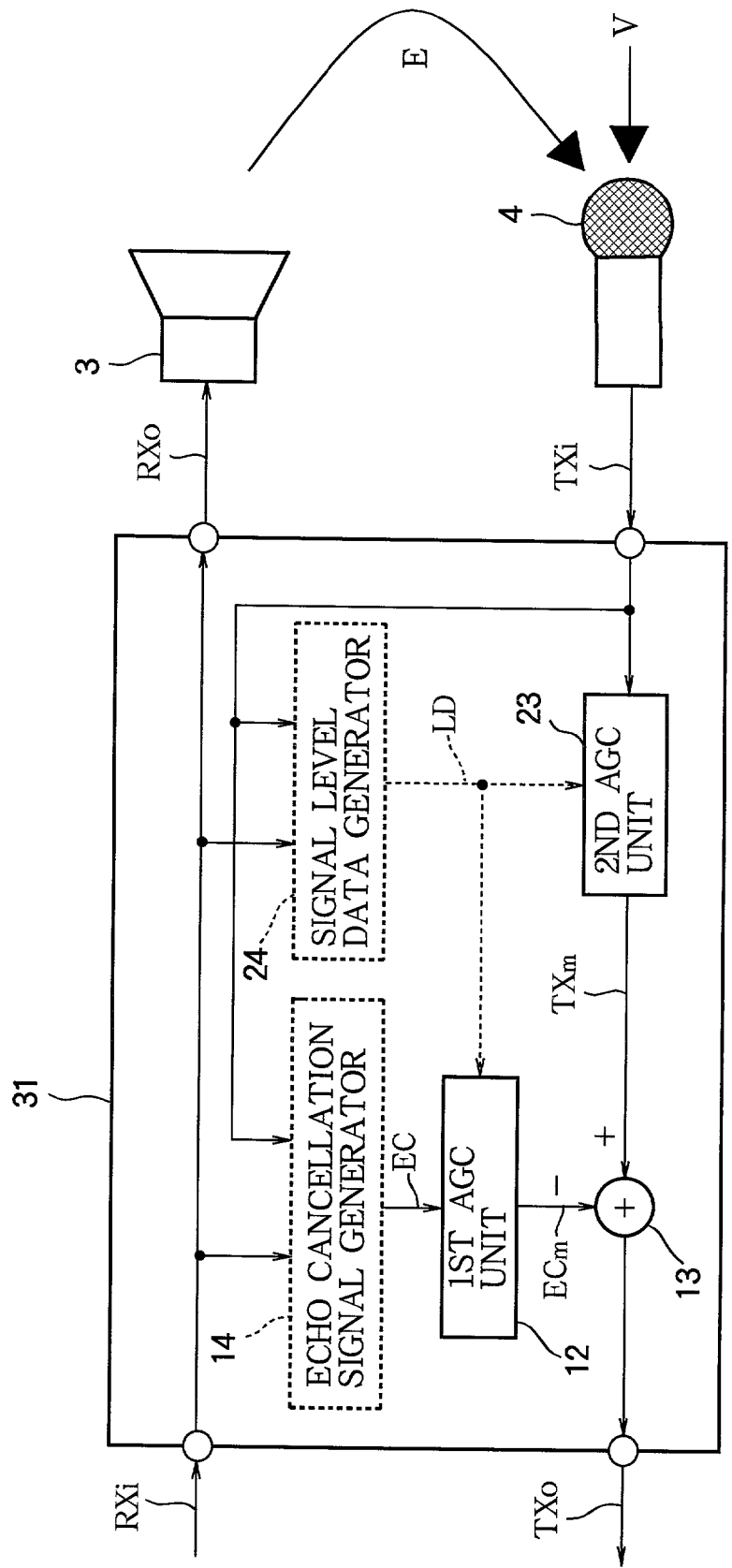

FIG. 6 illustrates the operation of the echo canceler 31 when conditions (a) and (b) are detected: that is, when the transmit input signal and receive input signal are both active (TXi≧TXi(min) and RXi≧RXi(min)). The echo cancellation signal generator 14 leaves the predictive filtering coefficients unchanged, and the signal level data generator 24 leaves the signal level data LD unchanged, as indicated by the dotted lines. The first and second AGC units 12, 23 operate with constant gain, so the near-end voice signal V is amplified or attenuated by the same amount, regardless of variations in the echo E. The echo cancellation signal generator 14 continues to generate an echo cancellation signal EC.

Since the echo component of the transmit signal and the echo cancellation signal EC are amplified or attenuated alike by the first AGC unit 12 and second AGC unit 23, the echo is cancelled accurately by subtraction of the amplified echo cancellation signal ECm. Since the gain is held constant, the volume of the near-end party's voice, as heard at the far end, is not affected by echo variations. If, for example, the far-end party inadvertently speaks while the near-end party is speaking, causing a temporary jump in the echo level, the far-end party hears the near-end party's voice reproduced at a steady level, as desired, and does not hear the echo, which is canceled by the echo canceler 31.

Figure 7:
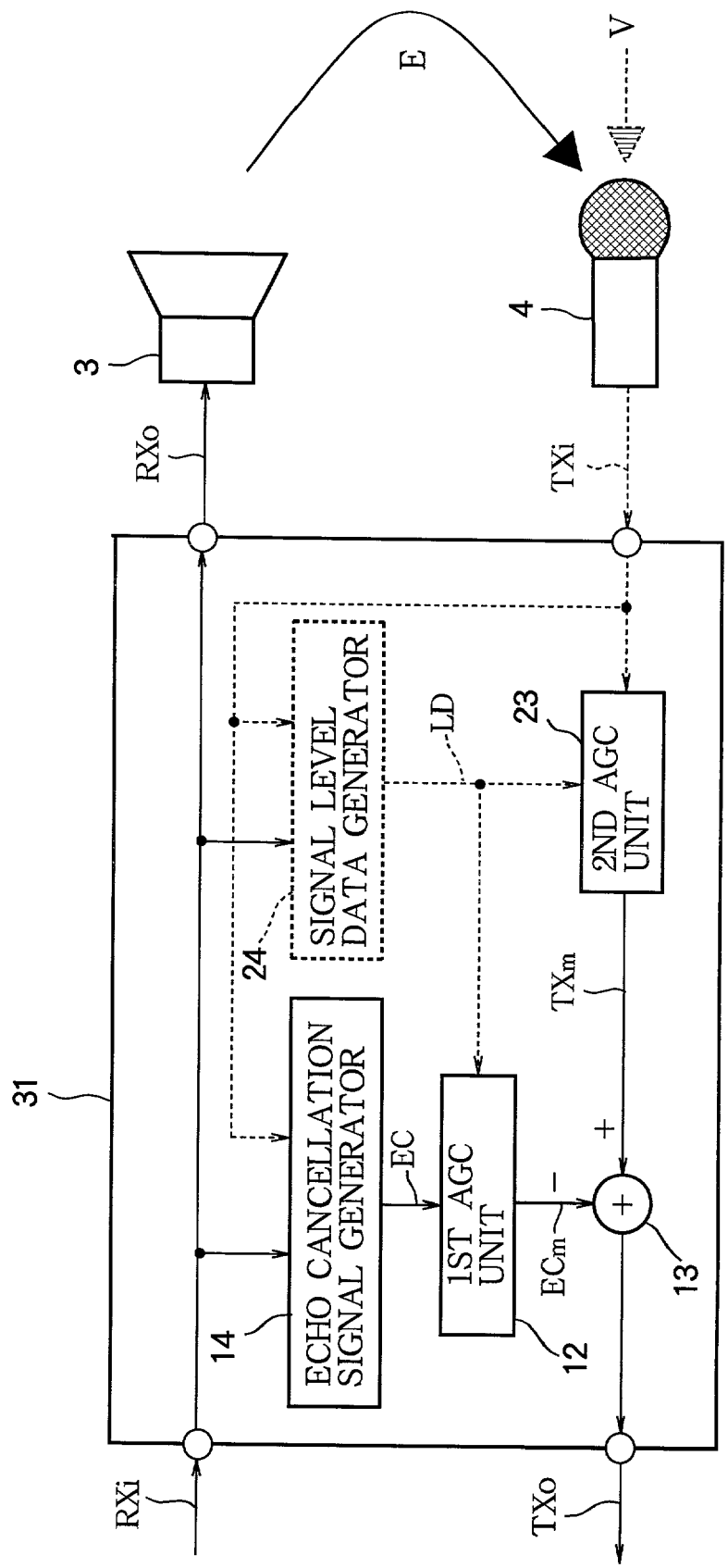

FIG. 7 illustrates the operation of the echo canceler 31 when conditions (b) and (c) are detected: that is, when the transmit input signal is inactive (TXi<TXi(min)) and the receive input signal is active (RXi≧RXi (min)). The signal level data generator 24 leaves the signal level data LD unchanged, but the echo cancellation signal generator 14 updates its filter coefficients, to adapt to possible changes in the characteristics of the echo path. The microphone 4 picks up an echo signal E, while the near-end voice signal V is substantially silent. Once the filter coefficients in the echo cancellation signal generator 14 have converged, the echo is canceled accurately by subtraction of the amplified echo cancellation signal ECm.

Figure 8:
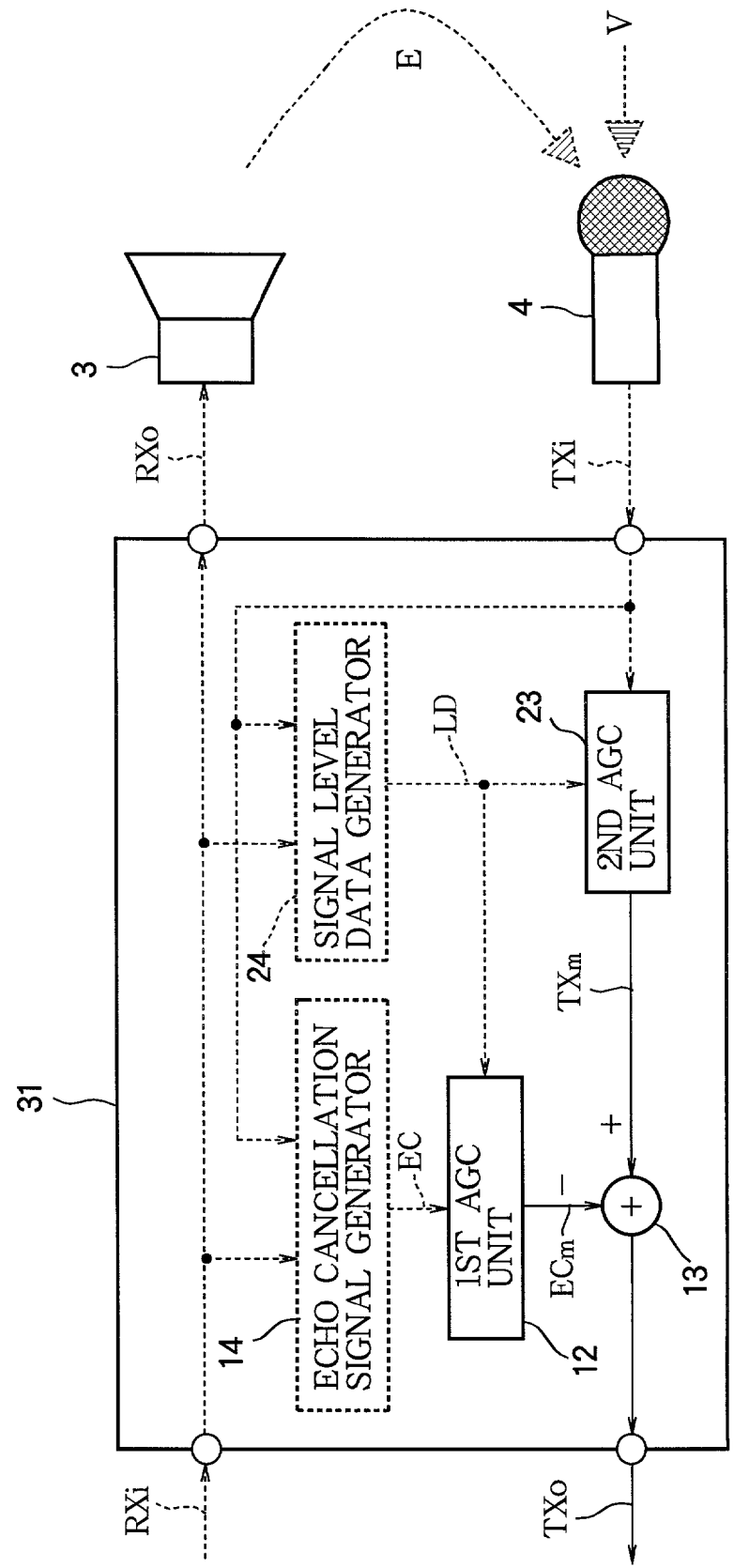

FIG. 8 illustrates the operation of the echo canceler 31 when conditions (c) and (d) are detected: that is, when the transmit input signal and receive input signal are both inactive (TXi<TXi(min) and RXi<RXi(min)). The echo cancellation signal generator 14 leaves the predictive filtering coefficients unchanged and the signal level data generator 24 leaves the signal level data LD unchanged, as indicated by the dotted lines, and the first AGC unit 12 and second AGC unit 23 operate with constant gain. Near-end voice V and echo E are both nearly absent, but as long as the characteristics of the echo path do not change, any small echo component that may be present in the transmit signal is cancelled accurately, because the echo component and the echo cancellation signal EC are equally amplified or equally attenuated by the two AGC units 12, 23.

In the invented echo canceler 31, the predictive filter coefficients are never updated while the gain of the automatic gain control units is being adjusted, so gain variations do not interfere with convergence of the filtering coefficients. Convergence delays are thus avoided.

Moreover, gain is not adjusted while strong echo is present. Accordingly, automatic gain control operates to hold the near-end party's voice at a constant level in the transmit output signal, as desired, and ignores variations in the echo level.

Furthermore, since automatic gain control of the transmit signal is matched by automatic gain control of the echo cancellation signal EC, and the same gain is used for both signals, accurate echo cancellation continues even while the gain is being adjusted, in distinct contrast to the prior art shown in FIG. 9.

In a variation of the embodiment above, the echo cancellation signal generator 14 also receives the transmit output signal TXo, for use in updating the predictive filtering coefficients.

In another variation, the first AGC unit 12 and second AGC unit 23 convert the signal level data LD to different gain values. The same effects are obtained, provided the two gain values are in constant proportion to one another.

The echo canceler 31 may employ either analog or digital circuitry. If digital circuits are used, analog-to-digital and digital-to-analog converters should be added to convert between the digital signals employed in the echo canceler 31 and the analog signals input and output by the loudspeaker 3 and microphone 4.

The invention may also be practiced in software by using digital signals and a general-purpose processor, programmed to carry out the functions described above.

Uses of the invention are not restricted to cordless telephone sets with hands-free or speakerphone functions. The invention can be practiced in any type of full-duplex communication device.

Those skilled in the art will recognize that further variations are possible within the scope claimed below.

What is claimed is:

1. A method of canceling an echo of a receive signal in a transmit signal while controlling a signal level of the transmit signal, comprising the steps of:
    (a) detecting activity of the transmit signal and the receive signal;
    (b) generating signal level data for the transmit signal;
    (c) updating the signal level data when the transmit signal is active and the receive signal is inactive, the signal level data being left unchanged when the receive signal is active;
    (d) generating an echo cancellation signal from the receive signal;
    (e) amplifying the echo cancellation signal according to the signal level data, thereby generating an amplified echo cancellation signal;
    (f) amplifying the transmit signal according to the signal level data, thereby generating an amplified transmit signal; and
    (g) subtracting the amplified echo cancellation signal from the amplified transmit signal, thereby generating a transmit output signal.

2. The method of claim 1, wherein said step (d) is carried out by use of coefficients, further comprising the step of:
    updating the coefficients when the transmit signal is inactive and the receive signal is active.

3. The method of claim 1, wherein said step (a) further comprises the steps of:
    comparing the transmit signal with a first minimum input level; and
    comparing the receive signal with a second minimum input level.

4. The method of claim 1, wherein said step (f) and said step (g) employ identical gain factors.

5. An echo canceler receiving a transmit signal and a receive signal, the transmit signal including an echo of the receive signal, comprising:
    an echo cancellation signal generator updating filter coefficients when the transmit signal is less than a first minimum input level and the receive signal exceeds a second minimum input level;
    a signal level data generator updating signal level data when the transmit signal exceeds the first minimum input level and the receive signal is less than the second minimum input level;
    a first automatic gain control unit updating a first gain when the signal level data generator updates the signal level data; and
    a second automatic gain control unit updating a second gain when the signal level data generator updates the signal level data.

6. An echo canceler receiving a transmit signal and a receive signal, the transmit signal including an echo of the receive signal, comprising:
    an echo cancellation signal generator generating an echo cancellation signal from the receive signal by use of filter coefficients, and updating the filter coefficients when the transmit signal is less than a first minimum input level and the receive signal exceeds a second minimum input level;
    a signal level data generator generating signal level data for the transmit signal and updating the signal level data when the transmit signal exceeds the first minimum input level and the receive signal is less than the second minimum input level, the signal level data being left unchanged when the receive signal exceeds the second minimum input level;
    a first automatic gain control unit coupled to the echo cancellation signal generator, amplifying the echo cancellation signal with a first gain responsive to the signal level data, and updating the first gain when the signal level data generator updates the signal level data, thereby generating an amplified echo cancellation signal;
    a second automatic gain control unit coupled to the signal level data generator, amplifying the transmit signal with a second gain responsive to the signal level data, and updating the second gain when the signal level data generator updates the signal level data, thereby generating an amplified transmit signal; and
    an arithmetic unit coupled to the first automatic gain control unit and the second automatic gain control unit, subtracting the amplified echo cancellation signal from the amplified transmit signal, thereby generating a transmit output signal for output from the echo canceler.

7. The echo canceler of claim 6, wherein the first gain is equal to the second gain.

* * * * *